US009792755B2

(12) United States Patent
Kurihara (10) Patent No.: US 9,792,755 B2
(45) Date of Patent: Oct. 17, 2017

(54) CONTENT DELIVERY APPARATUS, USER TERMINAL DEVICE, RELIEF MANAGEMENT METHOD AND COMPUTER PROGRAM

(75) Inventor: Shinichi Kurihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2695 days.

(21) Appl. No.: 11/878,383

(22) Filed: Jul. 24, 2007

(65) Prior Publication Data

US 2008/0052240 A1 Feb. 28, 2008

Related U.S. Application Data

(62) Division of application No. 11/373,096, filed on Mar. 13, 2006.

(30) Foreign Application Priority Data

Mar. 29, 2005 (JP) .................................. 2005-096392
Feb. 22, 2006 (JP) .................................. 2006-045405

(51) Int. Cl.
*G06F 21/00* (2013.01)
*G07F 17/00* (2006.01)
(Continued)

(52) U.S. Cl.
CPC .......... *G07F 17/0014* (2013.01); *G06F 21/10* (2013.01); *G06Q 10/10* (2013.01);
(Continued)

(58) Field of Classification Search
USPC ................................ 705/51, 59; 726/1, 2, 26
See application file for complete search history.

(56) References Cited

U.S. PATENT DOCUMENTS 5,671,412 A 9/1997 Christiano
6,502,079 B1 12/2002 Ball et al.
(Continued)

FOREIGN PATENT DOCUMENTS

EP 1 150 196 A2 10/2001
EP 1 635 344 A2 3/2006
(Continued)

OTHER PUBLICATIONS

Combined Search and Examination Report from the UK Intellectual Property Office for Application No. GB 0802218.8 dated Jun. 10, 2008 (6 pgs.).
(Continued)

*Primary Examiner* — Tsan-Yu J Huang
(74) *Attorney, Agent, or Firm* — Finnegan, Henderson, Farabow, Garrett & Dunner, L.L.P.

(57) ABSTRACT

A content delivery apparatus, when a content delivery request is outputted from a user terminal device, encrypts the requested content with an encryption key, adds a view period to it to deliver it to a request source and delivers a viewing key in response to a view request from the user terminal device within the view period. A user relief management unit monitors failure information notifying, grasps a delivery disabled period from the failure information, specifies a delivery destination user for a content of which the view period is overlapped with the delivery disabled period and issues a relief right with a relief period specified thereto to the specified user. A contract period processing unit manages the relief right and permits viewing within the relief period set by the relief right when a view right based on the relief right is output from the user terminal device.

3 Claims, 4 Drawing Sheets

(51) Int. Cl.
*G06F 21/10* (2013.01)
*G06Q 10/10* (2012.01)
*G06Q 20/12* (2012.01)
*G06Q 20/14* (2012.01)
*G06Q 30/02* (2012.01)
*H04L 29/06* (2006.01)

(52) U.S. Cl.
CPC ........... *G06Q 20/12* (2013.01); *G06Q 20/127* (2013.01); *G06Q 20/1235* (2013.01); *G06Q 20/14* (2013.01); *G06Q 30/02* (2013.01); *H04L 63/0428* (2013.01); *H04L 63/10* (2013.01); *G06F 2221/2101* (2013.01); *G06F 2221/2135* (2013.01); *G06F 2221/2137* (2013.01); *H04L 2463/101* (2013.01)

(56) References Cited

U.S. PATENT DOCUMENTS

| | | | |
|---|---|---|---|
| 6,535,592 B1 | 3/2003 | Snelgrove | |
| 6,834,195 B2* | 12/2004 | Brandenberg et al. | 455/456.3 |
| 6,983,371 B1* | 1/2006 | Hurtado et al. | 713/189 |
| 7,024,697 B2* | 4/2006 | Nitaki | 726/26 |
| 7,080,043 B2* | 7/2006 | Chase et al. | 705/59 |
| 7,305,366 B2* | 12/2007 | Chase et al. | 705/59 |
| 7,343,297 B2* | 3/2008 | Bergler et al. | 705/59 |
| 7,483,860 B2* | 1/2009 | Cronce et al. | 705/50 |
| 2002/0026478 A1* | 2/2002 | Rodgers et al. | 709/205 |
| 2002/0077985 A1 | 6/2002 | Kobata et al. | |
| 2002/0107806 A1 | 8/2002 | Higashi et al. | |
| 2002/0161835 A1* | 10/2002 | Ball et al. | 709/203 |
| 2003/0079008 A1* | 4/2003 | Fujii et al. | 709/223 |
| 2004/0010469 A1 | 1/2004 | Lenard et al. | |
| 2005/0021774 A1 | 1/2005 | Kurihara et al. | |
| 2005/0171913 A1 | 8/2005 | Kurihara et al. | |
| 2006/0026103 A1* | 2/2006 | Lee | 705/51 |
| 2006/0190406 A1 | 8/2006 | Shimizu et al. | |
| 2008/0022061 A1* | 1/2008 | Ito et al. | 711/162 |

FOREIGN PATENT DOCUMENTS

| | | |
|---|---|---|
| GB | 2 386 210 A | 9/2003 |
| GB | 2408 605 A | 6/2005 |
| JP | 2004-343238 | 12/2004 |
| JP | 2004-350150 | 12/2004 |
| WO | WO 01/20907 A1 | 3/2001 |
| WO | WO 01/77778 A2 | 10/2001 |

OTHER PUBLICATIONS

Combined Search and Examination Report issued by the British Patent Office on Jun. 19, 2006, for British Application No. GB0605015.7, (6 pgs).

IEEE, "IEEE 100: The Authoritative Dictionary of IEEE Standards Terms", 7$^{th}$ Edition, pp. 1234-1235 Published Dec. 2000. ISBN 0-73881-2601-2. (4 pgs).

* cited by examiner

CONTENT DELIVERY APPARATUS, USER TERMINAL DEVICE, RELIEF MANAGEMENT METHOD AND COMPUTER PROGRAM

CROSS-REFERENCE TO RELATED APPLICATIONS

This is a divisional of application Ser. No. 11/373,096, filed Mar. 13, 2006 (currently pending) and claims priority of Japanese Patent Applications 2005-096392, filed Mar. 29, 2005 and 2006-045405, filed Feb. 22, 2006 all of which are incorporated herein by reference.

BACKGROUND OF THE INVENTION

1. Field of the Invention

This invention relates to contents a content delivery apparatus which performs a delivery service of a content such as a video via a communication line to a terminal device on a user side, a user terminal device which receives the delivery service, a relief management method to relieve an impossibility of viewing when a failure occurs and a computer program which achieves the management method. More specifically, the present invention relates to a relief technique for a failure occurrence period within a period when a validity term is set to the content.

2. Description of the Related Art

A download type video content delivery service using a network such as a broadband encrypts the content with a specified encryption key to deliver it to a user terminal device of a request source and delivers the encryption key in response to a view request within a view period. The delivery service then makes it possible for the encrypted content to be decrypted and reproduced on a user terminal side. In such a system, the following cases or cases of combinations thereof are mainly utilized as view service forms:

a service in which a user can view contents as many as it wants within a fixed time period (for example one month) and in a prescribed range;

a service in which the user pay charges at every time when it selects contents to be viewed;

a service in which the user specifies the number of times of viewing and can view the contents by the specified times;

a service in which the user pays prescribed charges at every time when it views the contents; and a service in which the user specifies a time period and can view any number of times within the time period.

The service forms described above can be classified into two forms of a type which limits the number of times of the viewing and a type which permits the viewing by specifying the time period.

By the way, in the above-mentioned system to provide a content delivery as a service, it is preferable to provide compensation to the user in a certain form by taking into a consideration the case, in which a failure occurs in the system or the network (hereinafter, this compensation is referred to as user relief).

A conventional user relief method generally gets, in advance by a contract, an agreement that a service provider is dispensed a responsibility for the user in the case in which the failure occurs in the system or network.

However, a viewing service with a time limit causes a problem when the failure occurs in a time band desired by the user. That is, in such a case, although the user has any self-responsibility, the user tends to miss a viewing chance. And when the user cannot have a time to view the contents within the view period, the user complains extremely, so that the case may cause a trouble between the service provider and user. As like this case, when the user cannot receive an expected service, the service provider bears extra costs and burdens to offer apologies for every user so as to avoid dissatisfaction of the user and a loss of a belief of the service provider. This problem is caused from an insufficient relief method for the user, as a content of a service, and it is required for the problem to be solved quickly.

Jpn. Pat. Appln. KOKAI Publication No. 2004-350150 discloses the detailed contents of such a content delivery apparatus and a way of operations of its user terminal device.

Further, an invention regarding a relief method when a viewing quality is deteriorated in a content delivery system is disclosed in Jpn. Pat. Appln. KOKAI Publication No. 2004-343238. This delivery system however delivers content in a streaming type and relieves the content in accordance with a situation of deterioration in viewing quality, so that a viewing procedure is quite different from that of the delivery system of the present invention in which the encrypted content is downloaded and the encryption key is required for viewing it.

BRIEF SUMMARY OF THE INVENTION

An object of the present invention is to provide a content delivery apparatus, a user terminal device, a relief management method and a computer program which can sufficiently take measures for eliminating dissatisfaction of a user even when a failure occurs within a view period and the user cannot view a content within the view period, and thereby, can eliminate the dissatisfaction of the user, secure the belief of the service provider and eliminate extra costs and burdens and can achieve an operation with a satisfactory service.

A content delivery apparatus regarding the present invention, when a content delivery is requested from the user terminal device via a network, encrypting a requested content, delivering it to a request source while managing a view period, and delivering view permission information to decrypt the encrypted content in response to a view request from the user terminal device, comprises the following configuration: an unit to manage a delivery disabled period in which a delivery of the view permission information becomes impossible; an unit to specify a delivery destination user, for a content of which the view period is overlapped with the delivery disabled period, as a user to be relieved; an unit to issue a relief right with a relief period specified thereto to the user to be relieved to notify issue to the corresponding user terminal device; and an unit to management a relief right to deliver the view permission information only within the relief period set to the relief right when the view request is output from the user terminal device on the basis of the relief right.

A user terminal device used for a content delivery system regarding the present invention, outputting a delivery request for a content to a content delivery apparatus via a network in response to an operation of a user, storing a content encrypted and delivered with a view period by and from the delivery apparatus in response to the delivery request and decrypting the stored content by receiving view permission information to decrypt the encrypted content which is delivered from the content delivery apparatus in response to a view request within the view period, and when the content delivery apparatus manages a delivery disabled period in which a delivery of the view permission information becomes impossible, specifies a delivery destination user for a content of which the view period is overlapped with the delivery disabled period, as a user to be relieved, issues a relief right with a relief period specified thereto to the user and notifies issue of the relief right to the corresponding user terminal device, comprises a presentation means for presenting a notification of the issue of the relief right; and an unit to exert the relief right a view request based on the relief right to the content delivery apparatus in accordance with an input instruction from the user.

The relief management method of the content delivery system regarding to the present invention is a relief method used for a system, when a content delivery is requested from a user terminal device via a network, encrypting a requested content, delivering it to a request source while managing a view period, and delivering view permission information to decrypt the encrypted content in response to a view request within the view period from the user terminal device comprises managing a delivery disabled period in which a delivery of the view permission information becomes impossible; specifying a delivery destination user for a content of which the view period is overlapped with the delivery disabled period, as a user to be relieved; issuing a relief right with a relief period specified thereto to the user to be relieved to notify issue to the corresponding user terminal device; and managing the relief right to deliver the view permission information only within the relief period set to the relief right when a view request is output from the user terminal device on the basis of the relief right.

A computer program recorded on a recording medium for a content delivery apparatus which is used for a delivery apparatus and when a content delivery is requested from a user terminal device via a network, makes a computer execute processing of encrypting a requested content, delivering it to a request source while managing a view period, and delivering view permission information to decrypt the encrypted content in response to a view request from the user terminal device, the program comprises a means for instructing the computer to manage a delivery disabled period in which a delivery of the view permission information becomes impossible; a means for instructing the computer to specify a delivery destination user for a content of which the view period is overlapped with the delivery disabled period, as a user to be relieved; a means for instructing the computer to issue a relief right with a relief period specified thereto to the user to be relieved and notify issue to the corresponding user terminal device; and a means for instructing the computer to manage the relief right to deliver the view permission information only within the relief period set to the relief right when a view request is output from the user terminal device on the basis of the relief right.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail with reference to the drawings.

Figure 1:
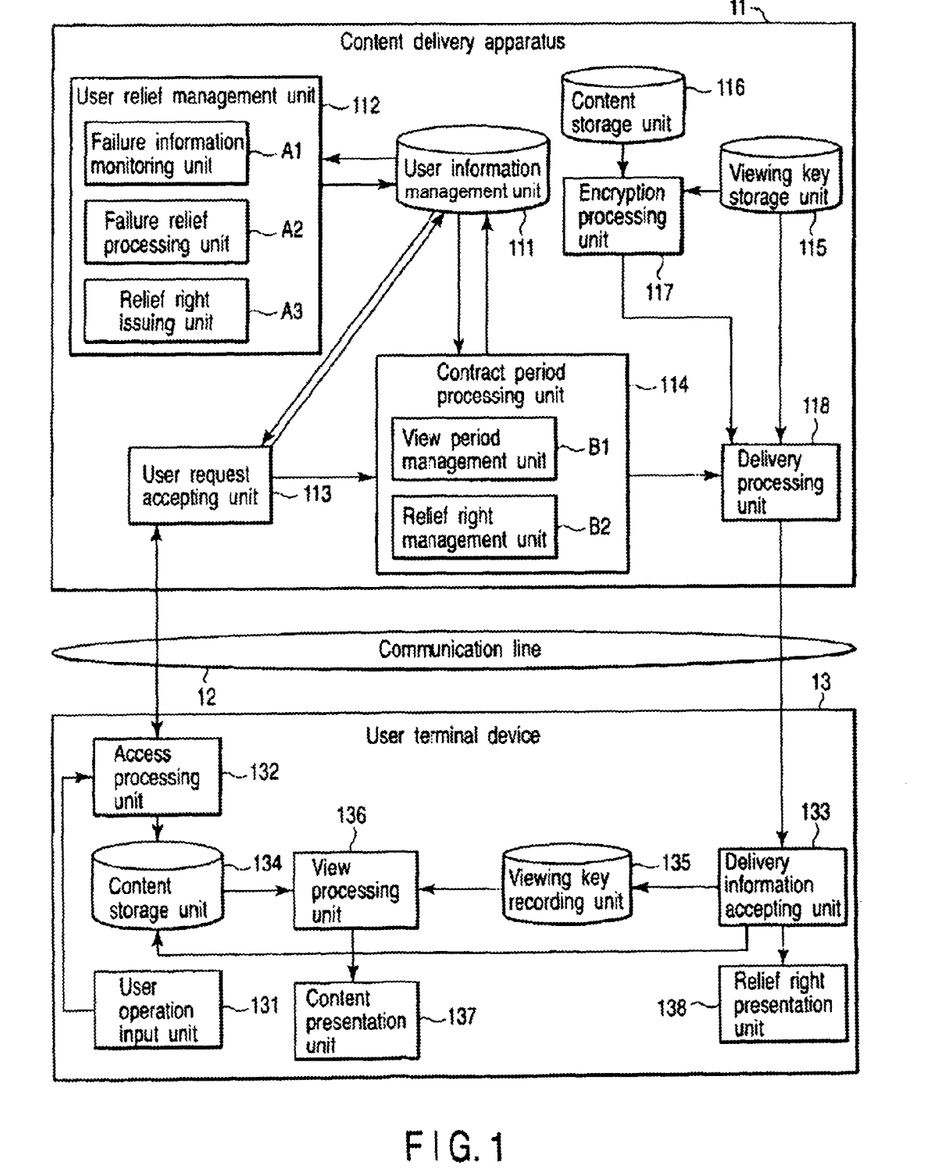
FIG. 1 is an exemplary block diagram showing a configuration of an embodiment of a content delivery system regarding the present invention.

FIG. 1 is the block diagram showing the configuration of the content delivery system regarding the present invention. In FIG. 1, the delivery system comprises a content delivery apparatus 11, a communication line 12 and a user terminal device 13.

The content delivery apparatus 11 includes a user information management unit 111, a user relief management unit 112, a user request accepting unit 113, a contract period processing unit 114, a viewing key storage unit 115, a content storage unit 116, an encryption processing unit 117 and a delivery processing unit 118.

The user information management unit 111 manages contract condition information to determine content viewing conditions contracted by a user other than user information to specify the corresponding user when a request is output from the user terminal device 13. Here, view period information requested from the user is an essential condition as the contract condition information.

The user relief management unit 112 includes a failure information monitoring unit A1, a failure relief processing unit A2 and a relief right issuing unit A3. The monitoring unit A1 receives failure occurrence information such as a period and place in which a failure such as a system failure and communication line failure from a manager or other related systems. The relief processing unit A2 specifies a relief period (time) to be relieved in which the user could not receive any service, based on the failure occurrence information and analyzes management information of the information management unit 111 to extract the corresponding user within the relief period. The issuing unit A3 adds relief right information (issues relief right) of the relief period (time) to registration information on the extracted user and simultaneously delivers the relief right information showing relief right issue to the corresponding user terminal device 13 through the delivery processing unit 118. When receiving a relief request from the corresponding user, the issuing unit A3 accepts the relief request to make the information management unit 111 update the management information thereof so as to correspond to relief.

The request accepting unit 113 accepts a download request (including selection information of content and view period), a view request and a relief request from the user terminal device 13 to extract the corresponding information from the information management unit 111 and checks it with authentication information such as an ID and a password sent from the user terminal device 13 to determine the propriety of access permission for the user. If the access is permitted, the request accepting unit 113 notifies user information and information showing a request content of an access source (hereinafter, referred to as access information) to the period processing unit 114 to shift processing. If the access is not permitted, the request accepting unit 113 notifies the fact to the access source to terminate a series of processing.

The period processing unit 114 has a view period management unit B1 and a relief right management unit B2. The period management unit B1 accepts access information from the request accepting unit 113 to determine whether there is any corresponding user by means of the information management unit 111 when the access information is one in relation to the download request and registers content information requested to be downloaded and its view period as its user information when there is the corresponding user. The period management unit B1 registers the user as a new user for a first when there is no corresponding user. For processing the download request, the period management unit B1 reads out the corresponding content from the content storage unit 116, encrypts the content with a prescribed viewing key by means of the encryption processing unit 117 and delivers it to the user terminal device 13 of the access source from the delivery processing unit 118.

The period management unit B1 accepts access information from the request accepting unit 113 to extract view period information of the corresponding user from the information management unit 111 when the access information is the view request and determines the propriety of viewing by checking it with a current date and time. Here, when the view request is first one, the period management unit B1 updates the information of the information management unit 111 to count down the view period on the basis of the updated information. As the result of the determination of the propriety, when the viewing is permissible, the period management unit B1 makes a shift to the request accepting unit 118 for delivery processing of the viewing key. When the viewing is not permissible, the period management unit B1 notifies the fact to the access source through the request accepting unit 113 to terminate a series of processing.

The period processing unit 114 has a relief right management unit B2. When receiving access information based on the relief right from the request accepting unit 113, the relief right management unit B2 extracts the relief right information of the corresponding user from the information management unit 111 on the basis of the access information and checks it with the current data and time to determine the propriety of viewing. Here, when the viewing request is first one, the period processing unit 114 updates the relief period information of the information management unit 111 to count down the relief period on the basis of the updated period information. As the determination result, when the viewing is permissible, the relief right management unit B2 makes the delivery processing unit 118 execute the delivery processing of the viewing key. When the relief right information is not extracted, the period management unit B1 notifies the fact to the access source through the request accepting unit 113 to terminate a series of processing.

The key storage unit 115 stores a key for viewing generated for decryption in accordance with a delivery destination and delivery conditions in delivering the encrypted content.

The content storage unit 116 stores a large number of contents prepared for deliveries and reads out the content requested to be downloaded by the user to send it to the encryption processing unit 117. The encryption processing unit 117 receives the viewing key from the key storage unit 115 to decrypt the input content therewith.

When the period processing unit 114 accepts the download request, the delivery processing unit 118 receives the encrypted content from the encryption processing unit 117 to deliver it to the user terminal device 13 of the request source. When the period processing unit 114 accepts the view request information, the delivery processing unit 118 extracts the viewing key corresponding to the delivery content from the key storage unit 115 to deliver it to the user terminal device of the access source and receives the relief right information from the relief management unit 112 to deliver it to the user terminal device 13 of the corresponding user.

On the other hand, the user terminal device 13 includes a user operation input unit 131, an access processing unit 132, a delivery information accepting unit 133, a content storage unit 134, a viewing key recording unit 135, a view processing unit 136, a content presentation unit 137 and a relief right presentation unit 138.

The operation input unit 131 is used for accepting input operations of the download request, the view request for the downloaded content and the relief request depending on the relief right by the user. When accepting these input operations of the requests, the operation input unit 131 notifies the requests to the access processing unit 132.

When receiving the notification of the requests, the access processing unit 132 accesses to the content delivery apparatus 11 via the communication line 12 to present the authentication information such as the ID and password and notifies the corresponding request information when the access permission is granted.

The information accepting unit 133 accepts the content, viewing key and relief right information delivered from the delivery processing unit 118 of the content delivery apparatus 11. When the delivered information is one showing the content, the information accepting unit 133 stores it in the content storage unit 116. When the delivered information is one indicating the viewing key, the information accepting unit 133 stores it in the key storage unit 135 [including information recording medium (HDD, DVD-RAM, DVD-R/W, DVD-R and IC such as SD card) and its drive device] 135 connected to the user terminal device 11. And when the delivered information is the relief right information, the information accepting unit 133 notifies the fact to the relief presentation unit 138 to present the fact that the relief right has been issued for the user.

The above-described embodiment may stores the whole of the viewing key information, however, if proper identification information on the user terminal device side is used for the generation of the viewing key, the embodiment may store only a part other than the identification information and assemble the viewing key in viewing the content.

The view processing unit 136 outputs the view request to the content delivery apparatus 11 in response to a viewing start instruction from the user and acquires the viewing key, being stored in the key storage unit 135, together with the encrypted content downloaded and stored in advance from the content storage unit 134 to decrypt the encrypted content with the viewing key.

Wherein, the content storage unit 134 is an information recording medium (HDD, DVD-RAM, DVD-R/W, DVD-R and IC such as SD card) and its drive device internally or externally connected and preliminarily stores some or the whole of the encrypted content downloaded from the content delivery apparatus 11 in advance.

When the relief right is issued on the side of the content delivery apparatus 11 and the fact is notified to the corresponding user, the user terminal device 13 appropriately presents the issue of the relief right on its screen. And when the user instructs the view request based on the issue of the relief right, the user terminal device 13 sends the view request based on the relief right to the content delivery apparatus 11.

The presentation unit 137 accepts the content information decrypted by the view processing unit 133 to present it on equipment such as a TV receiver.

Operational forms of the content delivery system regarding the present invention will be described in accordance with the above-mentioned configuration.

The user terminal device 13 downloads the encrypted content from the content delivery apparatus 11, and the content delivery apparatus 11 manages a period contracted by the user so as to view the content, determines a contract period on the basis of the view request from the user terminal device 13 to deliver the necessary information (viewing key) thereto. The user terminal device 13 decrypts the content downloaded in accordance with the information to appropriately enable displaying it on the TV receiver or the like.

A relief method when the viewing key cannot be delivered because of system-down during a certain period in the above-mentioned operations will be explained by referring to FIG. 2.

In the embodiment, the relief specifies a relief period longer than the failure occurrence period when the key cannot be delivered because of, for example, the system-down and its time period is going to enter a content view period (hereinafter, referred to as rental period) and issues itself as the relief right to the user when the relief is executed.

As an issue rule of the relief right is set, for example, as follows:

a content in rental use within a period specified as a system-down period is to be objected;

a relief right is stacked after the relief is executed and the relief right can be executed from the first reproduction after an expiration of a rental period; and a relief right stacked for one piece of rental use is one as maximum and when a plurality of times of relief are executed, the execution is added to the relief period of the relief right.

Figure 2:
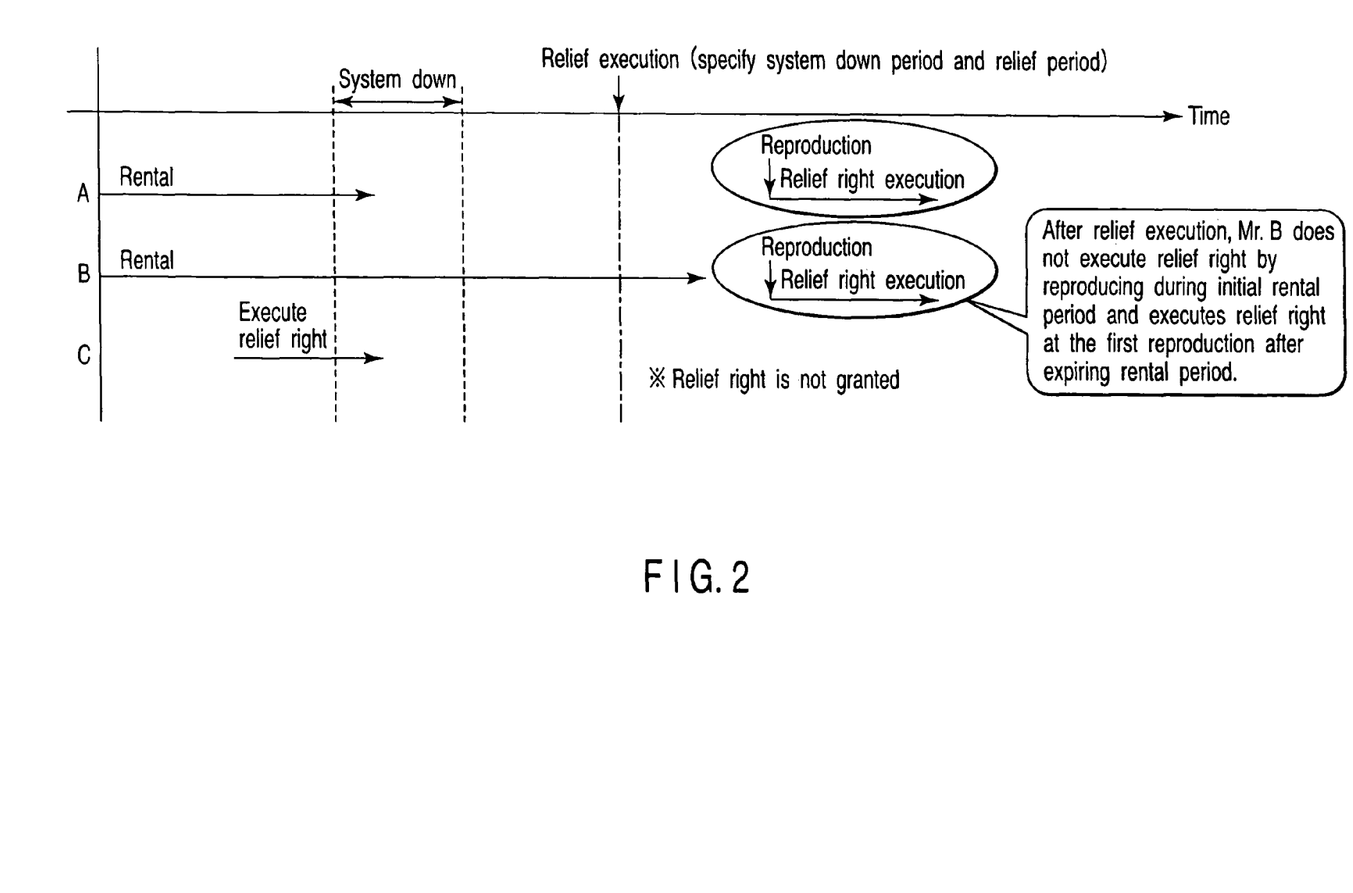
FIG. 2 is an exemplary conceptual view for explaining a relief method when any system-down is generated in the delivery system shown in FIG. 1.

A case A shown in FIG. 2 shows the case where a system-down occurs at the last in the rental period and a period, in which a part of the content becomes impossible to be viewed, occurs. In this case, although only the period, in which a part of the content becomes impossible to be viewed, should be relieved originally, since it becomes complicated for management to eliminate dissatisfaction of the user and set a relief period for every user, a fixed relief period is added thereto. In this case A, the relief is executed after the expiration of the rental period. In this case, when the adding of the relief right is notified to the user and when it recognizes the notification to start the reproduction, the start of the execution of the relief right is determined and the viewing of the content which has been impossible to be viewed in the set period.

A case B in FIG. 2 shows the case where a system-down occurs in the midst of the rental period and relief is executed therein. In this case, although the rental period has been lasting at the time of a relief execution, the relief period is not counted down from the start of the relief execution but it is counted down from the start of the first viewing within a specified period (for example, within one month) form the time of the relief execution. Whereby, the period in which the user can view the content owing to the relief right is secured independently from the rental period and the dissatisfaction of the user can be eliminated.

A case C shown in FIG. 2 shows the case where a system-down occurs during execution of the relief right. In this case, since a relief right stacked for one piece of rental use is executed, the relief right is not one which has newly issued but a measure such as extension of the relief period is performed.

The configuration to execute the above-described relief will be described with reference to FIG. 3 and FIG. 4.

Figure 3:
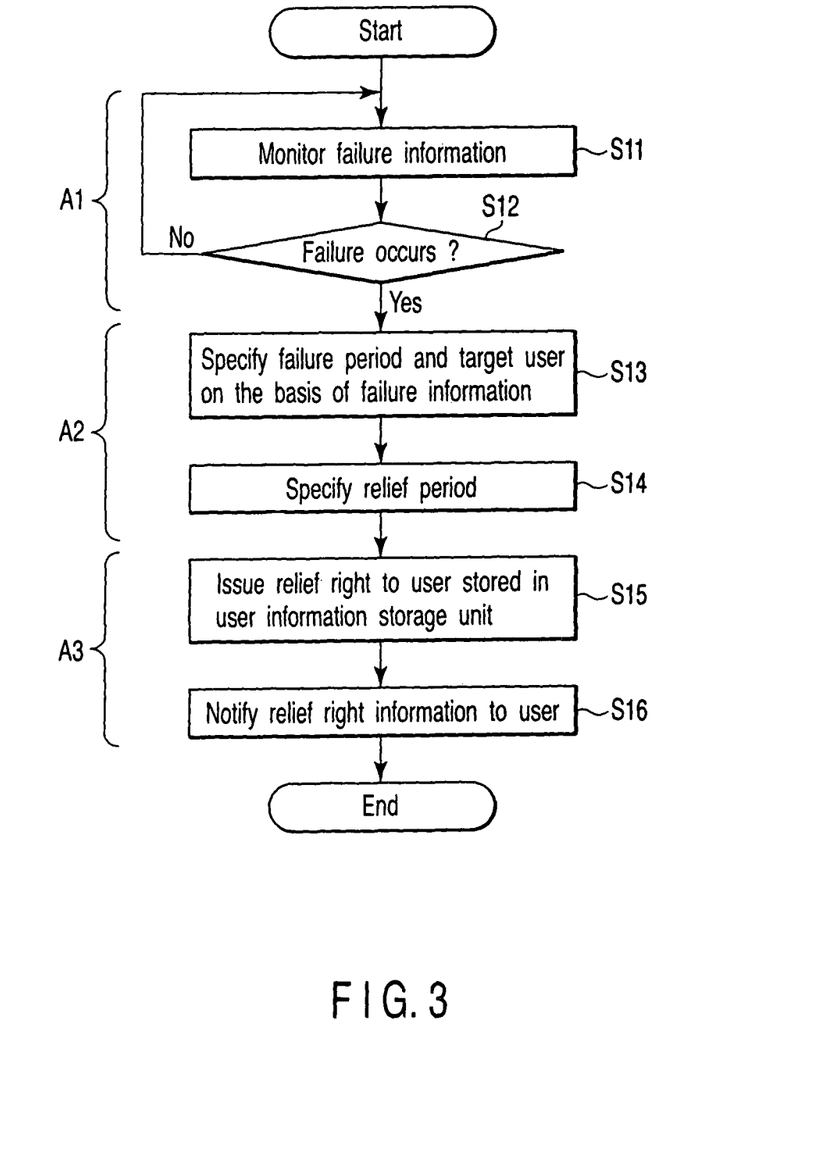
FIG. 3 is an exemplary flowchart showing a flow of processing of a user relief management unit used for the delivery system shown in FIG. 1.
Figure 4:
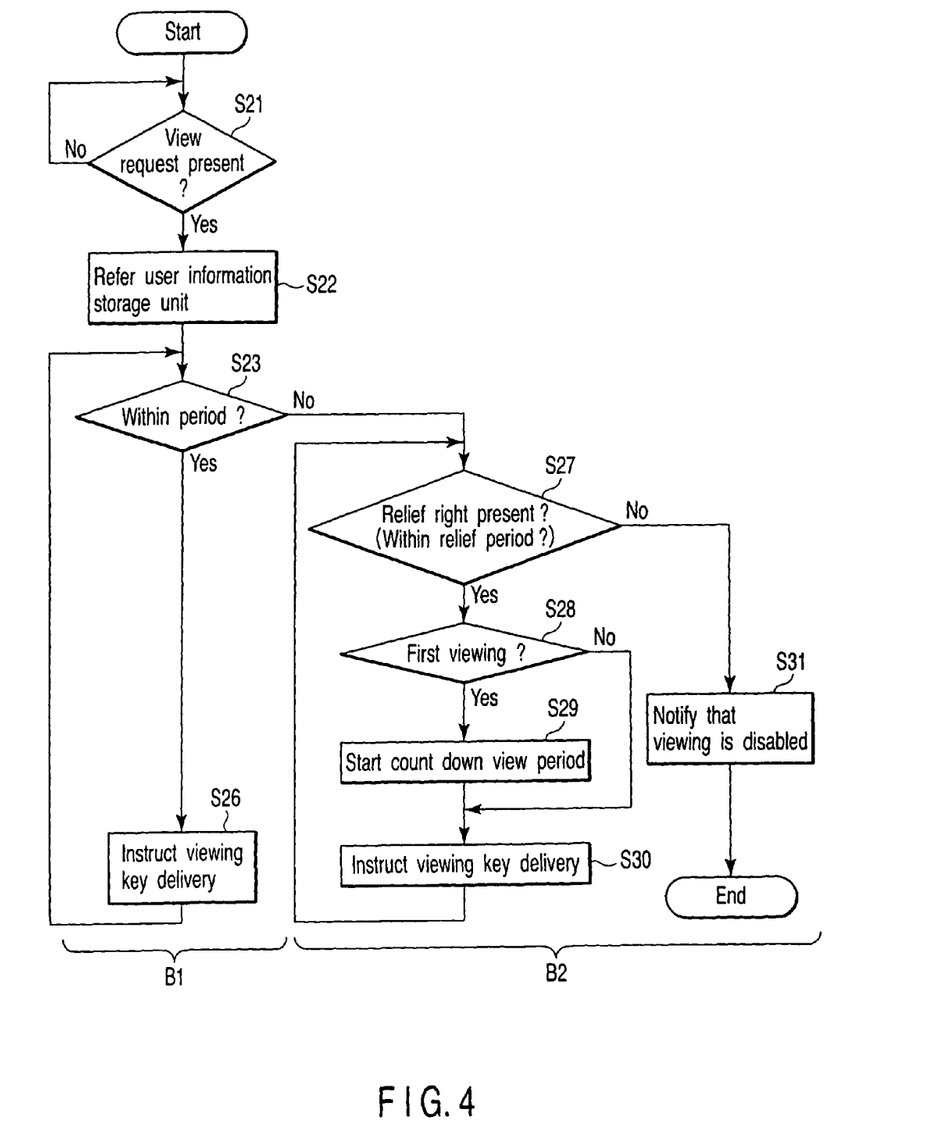
FIG. 4 is an exemplary flowchart showing a flow of processing of a contract period processing unit used for the delivery system shown in FIG. 1.

FIG. 3 is a flowchart showing a flow of processing of the user relief management unit 112, and FIG. 4 is a flowchart showing a flow of processing of the contract period processing unit 114.

At first, the relief management unit 112 monitors instruction information such as system-down directly input by the manager or failure information such as communication disconnection information from other related systems (step S11, S12), and specifies a failure period and a target user on the basis of the failure information when a failure occurrence is detected (step S13). The relief management unit 112 then specifies the relief period (step S14) to issue the relief right to the corresponding user of the user information management unit 11 (equivalent to relief execution shown in FIG. 2) (step S15), and notifies relief right information indicating the issue of the relief right to the corresponding user (step S16).

On the other hand, the contract period processing unit 114 monitors the presence or absence of the view request (step S21), refers the view conditions in the user information of the user information management unit 111 when the view request is present (step S22), and determines whether or not the view request has been received within the view period indicated in the view conditions (step S23). When the view request has been received within the view period, the period processing unit 114 instructs a viewing key delivery (step S26). After this, the period processing unit 114 executes the processing of the steps S23-S26 up to the view period repeatedly.

When it is determined that the view period has expired in the step S23, the period processing unit 114 determines whether the relief right has been added or not (whether within relief period or not) (step S27), and when the relief right has been added, it determines whether or not the viewing is the first viewing depending on the relief right (step S28). Then, when it is determined that the viewing is the first viewing the period processing unit 114 starts to count down the relief period (step S29) to instruct the viewing key delivery (step S30). When it is determined that the viewing is not the first viewing, the period processing unit 114 directly shifts to the processing in the step S30. After this, the period processing unit 114 executes the processing of the steps S27-S30 up to the end of the relief period repeatedly. When the relief right is not present or the execution thereof has completed in the step S27, the period processing unit 114 notifies that the viewing cannot be permitted (step S31) to terminate a series of processing.

According to the system of the present invention with the above-described relief processing added thereto, even when the failure occurs within the view period and the viewing in the view period becomes impossible, since the user can use the relief period as substitute for the view period from the time point desired by the user, the system can take measures sufficient to eliminate the dissatisfaction of the user.

Thereby, the system can eliminate the dissatisfaction of the user, secure the belief of the service provider, eliminate the extra costs and burdens then can realize the operations with the satisfactory service.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for delivering a content item in a content delivery system, the content delivery system including a computer that encrypts and delivers a content in response to a request received via a network from a user terminal device, and to manage a valid period for the user terminal device to use the content, the method comprising:
   detecting, by the computer, a period of time when communication on the network fails;
   specifying, by the computer, a user terminal device to be issued a relief right, by determining that the valid period for the user terminal device to use the content overlaps with the period of time when the communication fails;
   issuing, by the computer, the relief right to the user terminal device, the relief right indicating a relief period that allows the user terminal to decrypt the content at a time after the expiration of the valid period;
   sending, by the computer, a notification to the user terminal device to notify a corresponding user of the issued relief right;
   receiving, by computer from the user terminal, a view request to decrypt the content based on the relief right, the view request being received after the expiration of the valid period, and within the relief period;
   delivering, by the computer, view permission information for the user terminal device to decrypt the content in response to the view request; and
   storing, in a storage device, at least one of the view permission information or the content.

2. The relief management method of the content delivery system according to claim 1, further comprising:
   starting the relief period based on a time when the user terminal device requests the view permission information for the first time after the valid period of the content.

3. A non-transitory computer-readable storage medium having computer-readable code stored thereon that, when executed by a hardware processor causes the hardware processor to perform the steps comprising:
   detecting, by the computer, a period of time when communication on the network fails;
   specifying, by the computer, a user terminal device to be issued a relief right by determining that the valid period for the user terminal device to use the content overlaps with the period of time when the communication fails;
   issuing, by the computer, the relief right to the user terminal device indicating a relief period that allows the user terminal device to decrypt the content at a time after the expiration of the valid period;
   sending, by the computer, a notification to the user terminal device to notify corresponding user of the issued relief right;
   receiving, by the computer from the user terminal, a view request to decrypt the content based on the relief right, the view request being received after the expiration of the valid period, and within the relief period;
   delivering, by the computer view, permission information for the user terminal device to decrypt the content in response to the view request; and
   storing, in a storage device, at least one of the view permission information or the content.

* * * * *